(12) United States Patent
Ishizawa

(10) Patent No.: US 6,864,300 B2
(45) Date of Patent: Mar. 8, 2005

(54) PHOTOREACTIVE ADHESIVE COMPOSITION AND METHOD OF BONDING WITH THE SAME

(75) Inventor: Hideaki Ishizawa, Osaka (JP)

(73) Assignee: Sekisui Chemical Co., Ltd., Osaka (JP)

( * ) Notice: Subject to any disclaimer, the term of this patent is extended or adjusted under 35 U.S.C. 154(b) by 131 days.

(21) Appl. No.: 10/239,890

(22) PCT Filed: Mar. 27, 2001

(86) PCT No.: PCT/JP01/02462

§ 371 (c)(1),
(2), (4) Date: Sep. 26, 2002

(87) PCT Pub. No.: WO01/72920

PCT Pub. Date: Apr. 10, 2001

(65) Prior Publication Data

US 2003/0119978 A1 Jun. 26, 2003

(30) Foreign Application Priority Data

Mar. 29, 2000 (JP) ......................................... 2000-91667

(51) Int. Cl.$^7$ ............................... C08J 3/00; C08J 3/28; C08K 3/20; C08L 75/00; C08F 2/46
(52) U.S. Cl. ........................ 522/53; 522/162; 522/173; 524/589; 524/590
(58) Field of Search ................................ 524/589, 590; 522/53, 162, 173

(56) References Cited

FOREIGN PATENT DOCUMENTS

| JP | S61-031418 | 2/1986 |
|---|---|---|
| JP | S62-297334 | 12/1987 |
| JP | S63-046281 | 2/1988 |
| JP | S64-024821 | 1/1989 |
| JP | 08-100013 A1 | 4/1996 |
| JP | H09-263620 | 10/1997 |
| JP | H09-263635 | 10/1997 |
| JP | H10-007709 | 1/1998 |

OTHER PUBLICATIONS

Translation of JP 09–263620.*
Translation of JP 09–263635.*
International Search Report for PCT/JP01/02462 mailed on Jun. 26, 2001.
International Preliminary Examination Report dated Feb. 27, 2002.
Translation of International Preliminary Examination Report PCT/JP01/02462 mailed on Feb. 27, 2002.
European Search Report for co–pending application mailed on Sep. 14, 2004.

* cited by examiner

*Primary Examiner*—Patrick D. Niland
(74) *Attorney, Agent, or Firm*—Rader, Fishman & Grauer PLLC

(57) ABSTRACT

A photoreactive adhesive composition which is of the one-pack type, has excellent workability, cures upon irradiation with light, and can have sufficient initial adhesion strength and heat resistance immediately after bonding. The photoreactive adhesive composition comprises a urethane prepolymer and a compound which generates an amine upon irradiation with light, wherein the amine-generating compound is a cobalt/amine complex, O-acyloxime, or carbamic acid derivative.

5 Claims, 4 Drawing Sheets

PHOTOREACTIVE ADHESIVE COMPOSITION AND METHOD OF BONDING WITH THE SAME

TECHNICAL FIELD

This invention relates to a one-part photoreactive adhesive composition and a joining method utilizing the same, and more particularly to a photoreactive adhesive composition which exhibits sufficient initial bond strength and heat resistance via a reaction of an isocyanate group with an amino group produced when it is exposed to a light, and a joining method utilizing the same.

BACKGROUND ART

A one-part adhesive is generally supplied in the liquid form and coated onto an adherend, as by a brush or roller, which is subsequently joined to another adherend. After the joining, the adhesive solidifies as a result of evaporation of a solvent or growth of its molecular weight, so that the adherends are firmly bonded to each other.

General liquid adhesives exhibit high bond strength after completion of curing but need a relatively long time to complete the reaction. Accordingly, adherends must be provisionally held in contact with each other in some way until the liquid adhesive solidifies. This results in the insufficient workability.

Solvent-borne adhesives need a drying oven to vaporize a solvent and adversely affect working environments, which has been a problem.

As a solution to the above-described problems, Japanese Patent Laying-Open No. Sho 61-31418 discloses a one-part urethane adhesive. The one-part urethane adhesive exhibits high bond strength because it cures by a moisture-curing reaction. However, the one-part urethane adhesive fails to provide sufficient initial bond strength since its moisture-curing reaction proceeds insufficiently just after it has combined adherends together, and exhibits insufficient heat resistance just after it has combined adherends together.

Japanese Patent Laying-Open No. Sho 64-24821 discloses a photocurable polyurethane composition which contains a polyurethane oligomer having an active isocyanate group, a UV-curable organic compound having a hydroxyl group, and a photoinitiator.

Japanese Patent Publication No. Hei 7-103356 discloses a bonding method utilizing a photocurable polyurethane composition which contains an isocyanate compound, a free-radically photopolymerizable compound and a free-radically photopolymerizable monomer.

In cases where the preceding photocurable polyurethane compositions utilizing a free-radical photopolymerization reaction are used as adhesives, photocurable components must be increased in contents and crosslinked by irradiation to improve heat resistance of the adhesives immediately after combination of adherends. However, when the photocurable components are increased in contents and crosslinked by irradiation, adhesion of the composition to the adherends is lowered to result in the problematic reduction in initial bond strength and bond strength after cure.

DISCLOSURE OF THE INVENTION

It is an object of the present invention to provide a photoreactive adhesive composition which overcomes the above-described deficiencies encountered in prior art, is of the one-part type, has excellent workability, cures upon exposure to a radiation, and exhibits sufficient initial bond strength and heat resistance immediately after it has combined adherends.

The photoreactive adhesive composition in accordance with the present invention is characterized as containing A: an urethane prepolymer and B: a compound which generates amine upon exposure to a radiation, as essential components.

Preferably, a compound represented by the following formula 1, 2 or 3 is used as the aforementioned compound B.

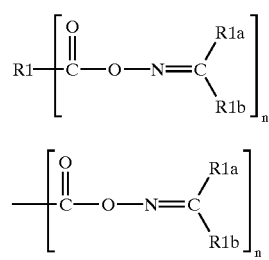

Formula 1

Formula 1a

In the formula 1, R1 is a main chain of a high polymer which has, at its side or end, an n-valent hydrocarbon or aromatic group, or n groups represented by the formula 1a, and n is an integer of 1 or larger.

In the formulas 1 and 1a, R1a is an aromatic or alkyl group and R1b is an aromatic or alkyl group.

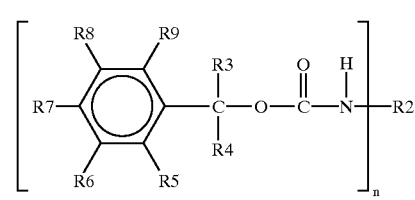

Formula 2

In the formula 2, R2 is a functional group comprised of C and H or C, H and O, preferably a hydrocarbon or aromatic group, more preferably an alkyl or alkylene group or a group represented by the following formula 2x, R3 and R4 represent any of hydrogen, halogen and alkyl, R5–R9 represent any of hydrogen, halogen, alkyl, alkoxy and nitro, and n is an integer of 1 or larger.

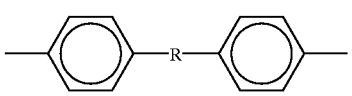

Formula 2x

In the formula 2x, R is an organic group, preferably an alkylene group.

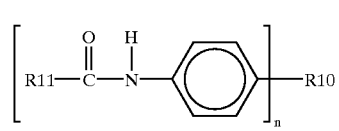

Formula 3

In the formula 3, R10 is a functional group comprised of C and H or C, H and O, preferably a hydrocarbon or aromatic group, more preferably an alkyl or alkylene group or a group represented by the following formula 3x, R11 is hydrogen, halogen or alkyl, R5–R9 represent any of hydrogen, halogen, alkyl, alkoxy and nitro, and n is an integer of 1 or larger.

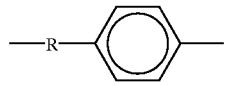

Formula 3x

In the formula 3x, R is an organic group, preferably an alkylene group, more preferably a methylene or ethylene group.

(Urethane Prepolymer)

The urethane prepolymer is obtained as a reaction product of a polyhydroxy compound and a polyisocyanate compound and has an isocyanate residue.

The polyhydroxy compound for use in the preparation of the urethane prepolymer is not particularly specified in type. Examples of polyhydroxy compounds include those generally used in the preparation of urethane compounds, such as polyether polyol, polyester polyol and polymer polyol.

The above-listed polyhydroxy compounds may be used alone or in combination.

The polyether polyol is not particularly specified and may be a polymer obtained, for example, by allowing alkylene oxide to undergo a ring-opening polymerization under the presence of a low-molecular, active hydrogen compound having at least two active hydrogens.

Specific examples of low-molecular, active hydrogen compounds having at least two active hydrogens include diols such as bisphenol A, ethylene glycol, propylene glycol, butylene glycol and 1,6-hexane diol; triols such as glycerin and trimethylolpropane; and amines such as ethylenediamine and butylenediamine.

These low-molecular, active hydrogen compounds having at least two active hydrogens may be used alone or in combination.

Specific examples of alkylene oxides include, but not limited to, ethylene oxide, propylene oxide, butylene oxide, amylene oxide, hexylene oxide, and tetrahydrofuran.

The above-listed alkylene oxides may be used alone or in combination.

Example of polyester polyols include, but not limited to, polymers obtained via dehydration condensation of a polybasic acid, such as adipic acid, azelaic acid, sebacic acid, terephthalic acid, isophthalic acid or succinic acid, with a polyol such as bisphenol A, ethylene glycol, 1,2-propylene glycol, 1,4-butanediol, diethylene glycol, 1,6-hexane glycol or neopentyl glycol; polymers of lactones such as ε-caprolactone and α-methyl-ε-caprolactone; and polymers obtained by dehydration condensation of a hydroxycarboxylic acid, such as castor oil or a reaction product of castor oil and ethylene glycol, with any of the above-listed polyols.

The above-listed polyester polyols may be used alone or in combination.

The polymer polyol is not particularly specified in type. Examples of polymer polyols include graft polymers obtained via graft copolymerization of an ethylenically unsaturated compound, such as acrylonitrile, styrene or methyl (meth)acrylate, with any of the above-listed polyether polyols and polyester polyols; 1,2-polybutadiene polyol, 1,4-polybutadiene polyol and hydrides thereof.

The above-listed polymer polyols may be used alone or in combination.

Although not particularly limiting, the polymer polyol preferably has a weight average molecular weight in the approximate range of 100–50,000, more preferably in the approximate range of 500–5,000.

Examples of polyisocyanate compounds useful in the preparation of the urethane prepolymer include, but not specifially limited to, 2,4-tolylene diisocyanate, phenylene diisocyanate, xylene diisocyanate, 4,4'-diphenylmethane diisocyanate (MDI), a mixture (crude MDI) of MDI with triphenylmethane triisocyanate or the like, 1,5-naphthylene diisocyanate, isophorone diisocyanate, dicyclohexylmethane diisocyanate, ethylene diisocyanate, methylene diisocyanate, propylene diisocyanate, tetramethylene diisocyanate, triphenylmethane triisocyanate and hydrides thereof. The use of MDI and crude MDI, among them, is preferred for their excellence in safety and reactivity.

The above-listed polyisocyanates may be used alone or in combination.

A preparation method of the urethane prepolymer is not particularly specified. For example, the aforementioned polyhydroxy compound and polyisocyanate compound may be mixed such that a ratio in equivalents of the isocyanate (NCO) group of the polyisocyanate compound to the hydroxyl (OH) group of the polyhydroxy compound, i.e., an NCO/OH equivalent ratio falls within the range of 1.2–15, preferably 3–12. The subsequent reaction of the mixture at about 80–100° C. for about 3–5 hours, under a nitrogen stream, results in obtaining the urethane prepolymer.

If the NCO/OH equivalent ratio falls below 1.2, a viscosity of a resulting urethane prepolymer may become excessively high to result in the difficulty to prepare an adhesive composition. On the other hand, if the NCO/OH ratio exceeds 15, a resulting adhesive composition increases its tendency to foam when it is cured and may in some cases lower a cohesion of a cured product to result in the failure to exhibit sufficient bond strength.

(Compound which Generates Amine Upon Exposure to Radiation)

The compound which generates amine upon exposure to radiation, for use in the present invention, is not particularly specified, so long as it has the ability to generate amine upon exposure to radiation. Useful compounds preferably generate polyfunctional amine, more preferably primary or secondary amine having plural amino groups.

Examples of such compounds include (1) a cobalt amine complex, (2) O-acyloxime and (3) carbamic acid derivative, which are all below described.

(1) Cobalt amine complex: $Co(NH_2R12)_5X^{2+}$ wherein R12 represents H or $CH_3$ and X represents halogen.

(2) The compound represented by the formula 1 is used as the O-acyloxime. In the formula 1, R1 represents a main chain of a high polymer which has, at its side or end, n-valent hydrocarbon or aromatic group or n groups represented by the formula 1a, and n is an integer of 1 or larger. Preferably, R1 is an alkyl, aromatic, alkylene, a main chain of an olefinic polymer, or an ethylenically unsaturated functional group. More preferably, R1 is a compound represented by any of the following formulas 5a–5b.

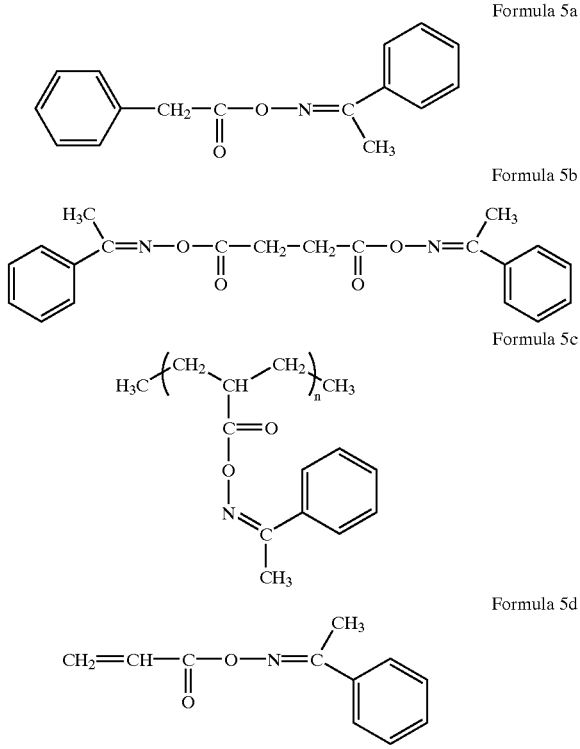

Formula 5a
Formula 5b
Formula 5c
Formula 5d

One preferred method for synthesis of the compound represented by the formula 2 involves reacting 2-nitrobenzyl alcohol or its derivative with a polyfunctional isocyanate compound.

Examples of useful polyfunctional isocyanate compounds include, but not limited to, 2,4-tolylene diisocyanate (TDI), 2,6-tolylene diisocyanate (TDI), 1,3-bis(isocyanatomethyl) benzene (XDI), 1,3-bis(isocyanatomethyl)cyclohexane (H6XDI), hexamethylene diisocyanate (HDI), phenylene diisocyanate, xylene diisocyanate, 4,4'-diphenylmethane diisocyanate (MDI), a mixture (crude MDI) of MDI and triphenylmethane triisocyanate or the like, 1,5-naphthylene diisocyanate, isophorone diisocyanate, dicyclohexyl-methane diisocyanate, ethylene diisocyanate, methylene diisocyanate, propylene diisocyanate, tetramethylene diisocyanate, triphenylmethane triisocyanate, and their hydrides.

In the synthesis of the compound represented by the formula 2, a catalyst known as being useful in reacting hydroxyl with isocyanate groups, e.g., a metal acetate, metal chloride, copper sulfate or di-n-butyltin dilaurate, may be used.

The compounds represented by the following formulas 2a–2c may preferably be useful as the compound represented by the formula 2.

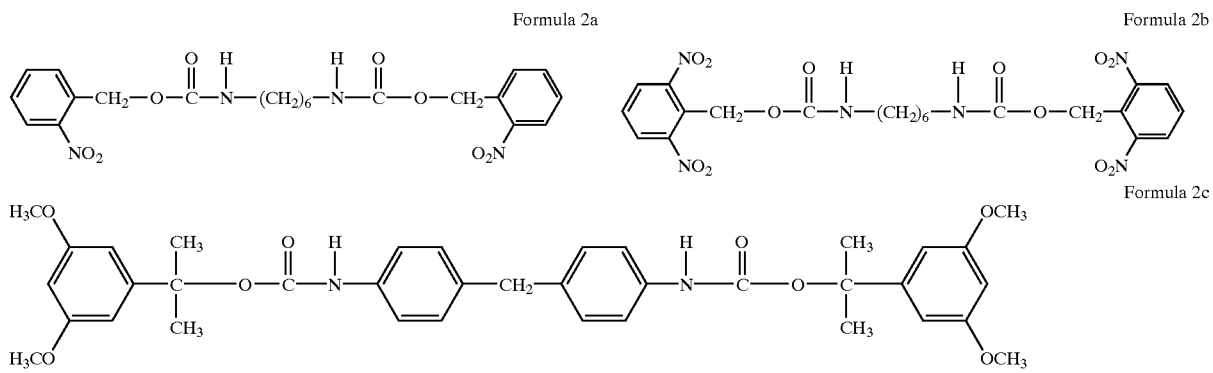

Formula 2a
Formula 2b
Formula 2c (3) Carbamic acid derivative

Examples of carbamic acid derivatives include the compounds represented by the formulas 2 and 3. In the formulas 2 and 3, R2 is a functional group comprised of C and H, or C, H and O, specific examples of which include alkyl and aromatic groups.

In the formula 2, the following a)–c) illustrate suitable combinations of the substituent groups R3–R9.

a) At least one of R5 and R9 is a nitro group, R6–R8 are independently hydrogen or methoxy, and R3 and R4 are independently hydrogen or alkyl having 1–2 carbon atoms.

b) R7 is a nitro group, R5, R6, R8 and R9 are independently hydrogen or methoxy, and R3 and R4 are independently hydrogen or alkyl having 1–2 carbon atoms.

c) R6 and R8 are both methoxy, R5, R7 and R9 are all hydrogen, and R3 and R4 are independently hydrogen or alkyl having 1–2 carbon atoms.

Synthesis of the compound represented by the formula 3 may be achieved by utilizing a reaction between amine and organic acid or between isocyanate and organic acid, for example.

For example, a) a reaction of diphenylmethane-4,4'-diamine with aliphatic acid, benzoic acid or the like, or alternatively, b) a reaction of diphenylmethane-4,4'-diisocyanate with aliphatic acid, benzoic acid or the like may be utilized to synthesize the compound represented by the formula 3.

In the synthesis of the compound represented by the formula 3, a catalyst known as being useful in reacting amino with carboxyl groups or isocyanate with carboxyl groups may also be used.

The compounds represented by the following formulas 3a–3e may preferably be useful as the compound represented by the formula 3. In the formulas 3a–3c, R11 and R13 represent any of hydrogen, hydrocarbon and aromatic groups, and R12 is a divalent organic group, preferably a divalent hydrocarbon group, more preferably an alkylene group.

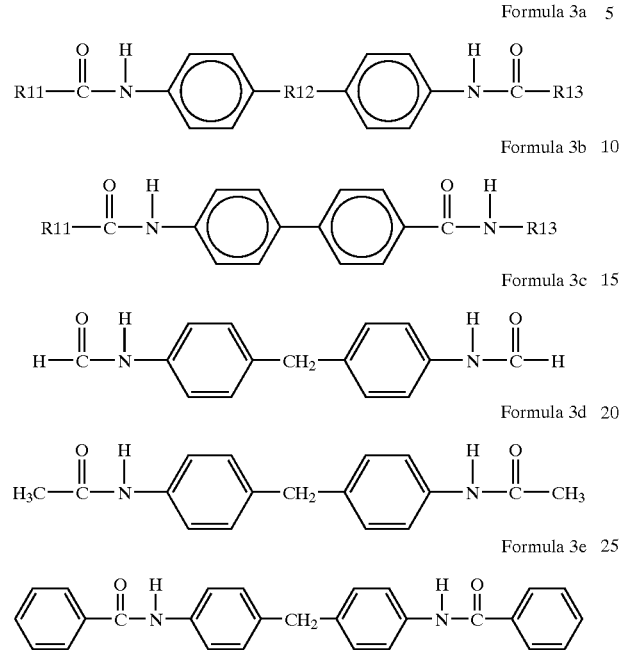

(Blending Proportion)

In the present invention, the urethane prepolymer and the compound which generates amine upon exposure to radiation may preferably be blended such that a ratio of equivalents of the isocyanate group of the urethane prepolymer to the amino group to be generated upon exposure to radiation falls within the range of 1:0.01–1:1.2. If the equivalent of the amino group, based on 1 equivalent of the isocyanate group, is below 0.01, curing of the urethane prepolymer when exposed to radiation may become insufficient to result in the failure to exhibit sufficient initial bond strength and heat resistance. If it exceeds 1.2, the exposure of the adhesive composition to radiation may result in the reduced adhesion between adherends, the shortened work life and the insufficient bond strength.

(Photosensitizer)

When necessary, a photosensitizer may be further added to the photoreactive adhesive composition in accordance with the present invention. Useful photosensitizers include triplet excitation energy transfer photosensitizers and electron transfer photosensitizers. Specific examples of photosensitizers include acetophenones, benzophenone, Michler's ketone, benzil, benzoin, benzoin ether, benzyldimethyl ketal, benzoyl benzoate, α-acyloxime ester, tetramethylthiuram monosulfide, thioxanthone and its derivatives, aliphatic amine, aromatic-containing amine, aromatic compounds with a nitrogen atom constituting a part of an aromatic ring such as piperidine, allylthiourea, O-tolylthiourea, sodium diethyl dithiophosphate, soluble salts of aromatic sulfinic acid, N,N-disubstituted-p-aminobenzo-nitrile compounds, tri-n-butylphosphine, N-nitrosohydroxyl-amine derivatives, oxazolidine compounds, tetrahydro-1,3-oxazine compounds, formaldehyde and its condensate with diamine, anthracene and its derivatives, xanthine; cyanine dyes such as phthalocyanine, naphthocyanine and thiocyanine; and porphyrin and its derivatives.

Among them, thioxanthone and its derivatives, as represented by the following formula 4, are preferred for their superior ability to increase the radiation sensitivity of the compound B.

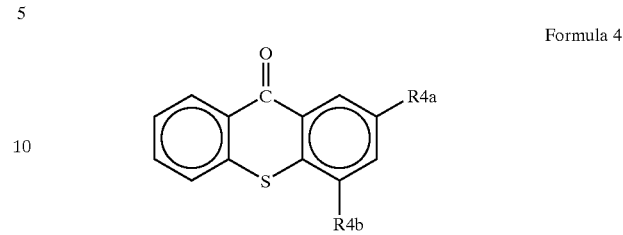

In the formula, R4a is hydrogen, alkyl or halogen and R4b is hydrogen or alkyl. Preferably, R4a is Cl and R4b is H, R4a and R4b are both ethyl, R4a and R4b are both isopropyl, or R4a and R4b are both methyl.

(Gel Fraction After Irradiation)

Preferably, the photoreactive adhesive composition in accordance with the present invention, immediately after its exposure to radiation, exhibits a gel fraction in the range of 5 weight %–60 weight %, more preferably in the range of 10–50 weight %. This assures sufficient heat resistance of the adhesive composition immediately after irradiation. When necessary, subsequent to irradiation, heat may be applied to accelerate a curing reaction of the composition and increase its heat resistance just after irradiation.

(Additives)

Other than the essential components, the adhesive composition in accordance with the present invention may further contain, within the range that does not interfere with the purposes of the present invention, one or more of the following additives: a silane coupling agent as an adhesion-imparting agent; filler; thixotropic agent; colorant; plasticizer (softener); stabilizer; antioxidant; UV absorber; and organic solvent.

Examples of silane coupling agents include, but not limited to, aminoalkoxy silanes such as γ-aminomethyltriethoxysilane and N-β(aminoethyl)-γ-aminopropyltrimethoxysilane; mercaptoalkoxy silanes such as γ-mercaptopropyltrimethoxysilane; epoxyalkoxy silanes such as γ-glycidoxypropyltrimethoxysilane and 3,4-epoxycyclohexylethyltrimethoxysilane; vinyl silanes such as vinyl-tris(β-methoxyethoxy)silane and vinyltriethoxysilane; and silane compounds having isocyanate and alkoxysilyl groups, one for each, such as γ-isocyanatepropyltriethoxysilane. One or more of these silane coupling agents may be suitably used.

Examples of fillers include, but not particularly limited to, mica powder, calcium carbonate, surface-treated calcium carbonate, carbon blck, talc, titanium oxide, rubber powder, organic balloon, inorganic balloon and wollastonite. One or more of these fillers may be suitably used.

The filler is not particularly specified in shape and may have any form of a powder, flake, sphere, bulk and needle.

Examples of thixotropic agents include, but not limited to, colloidal silica, hydrogenated castor oil and organic bentonite. One or more of these may be suitably used.

Examples of plasticizers include, but not limited to, dioctyl phthalate (DOP), dibutyl phthalate, dilauryl phthalate, dioctyl adipate, diisodecyl adipate, tributyl phosphate, trioctyl phosphate, propylene adipate glycol polyester, butylene adipate glycol polyester, epoxidized is soybean oil, chlorinated paraffin and liquid paraffin. One or more of these may be suitably used.

Examples of stabilizers include, but not limited to, "TINUVIN 327" (product of Ciba Geigy Co.), "IRGANOX 1010" (product of Ciba Geigy Co.) and "TOMISORP 800" (product of Yoshitomi Pharmaceutical Indstries, Ltd.). One or more of these may be suitably used.

Examples of organic solvents include, but not limited to, synthetic isoparaffin solvents having flash points of 40° C. and higher. One or more of these may be suitably used.

The photoreactive adhesive composition in accordance with the present invention is used in the form of a one-part urethane-based photoreactive adhesive, as described above. When exposed to a radiation, the above-specified compound generates amine which is subsequently caused to react with the isocyanate group of the urethane prepolymer.

Because this reaction proceeds quickly, the composition immediately after it combines adherends exhibits sufficient initial tack, holding power and heat resistance The curing reaction of the urethane prepolymer is subsequently allowed to proceed with the aid of a moisture. As a result, the composition finally exhibits high bond strength.

In addition to being useful as an adhesive, the photoreactive adhesive composition in accordance with the present invention is useful as a sealer.

BEST MODE FOR CARRYING OUT THE INVENTION

Figure 1:
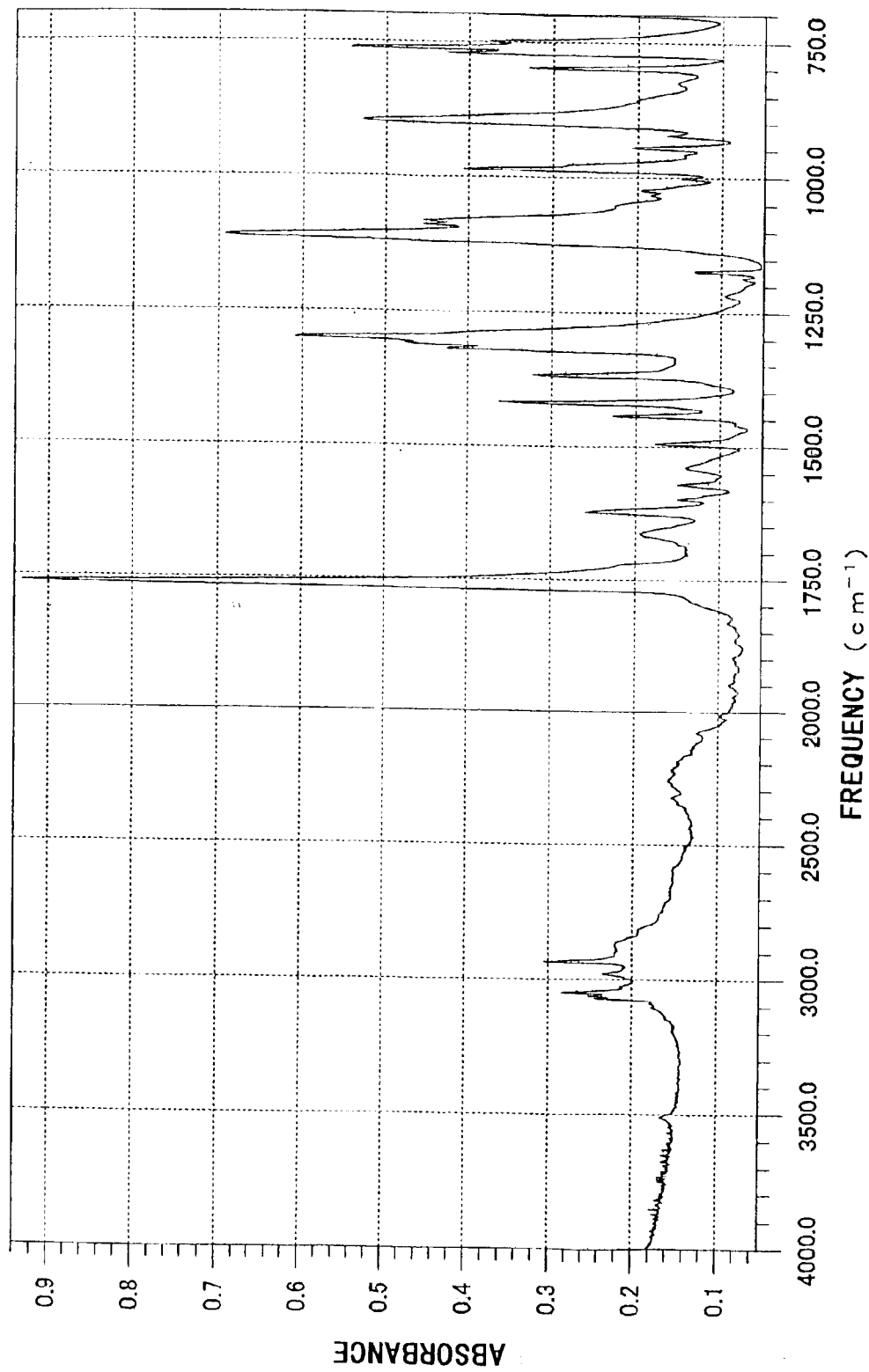
FIG. 1 is a chart showing an infrared absorption spectrum of the compound 1 prepared in the Example.

The following non-limiting examples illustrate the present invention.

(Synthesis of the Compound Represented by the Formula 1)

Compound 1

2.7 g of the acetophenone oxime represented by the following formula 6 was dissolved in 5 ml chloroform to which 1.55 g of the succinyl chloride represented by the following formula 7 was subsequently added in a dropwise manner. Thereafter, the mixture was stirred at room temperature for 24 hours. The resulting white solid was dissolved in chloroform and then recrystalized. The resulting crystal was designated as the compound 1 having the structure specified by the preceding formula 5a.

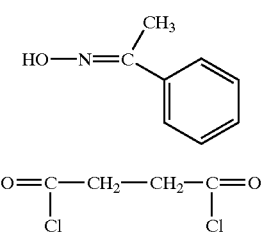

Formula 6

Formula 7

(Synthesis of the Compound Represented by the Formula 2)

Compound 2

2-nitrobenzyl alcohol was dissolved in methyl ethyl ketone (MEK) to which 2,4-tolylene diisocyanate (TDI) was added dropwise such that a ratio in moles of the OH group of 2-nitrobenzyl alcohol to the NCO group of TDI was brought to 1:1. Thereafter, they were allowed to react until the isocyanate group was reduced to 10% or less of its initial amount.

The resulting white crystal was washed with MEK to remove residual 2-nitrobenzyl alcohol and TDI that were left unreacted, and then designated as the compound 2 having the structure specified by the following formula 8.

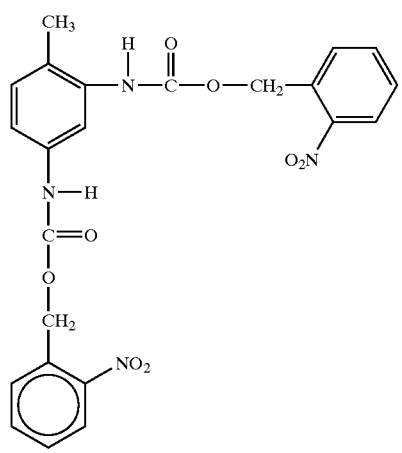

Formula 8

Compound 3

2-nitrobenzyl alcohol was dissolved in methyl ethyl ketone (MEK) to which hexamethylene diisocyanate (HDI) was added dropwise such that a ratio in moles of the OH group of 2-nitrobenzyl alcohol to the NCO group of HDI was brought to 1:1. Thereafter, they were allowed to react until the isocyanate group was reduced to 10% or less of its initial amount.

The resulting white crystal was washed with MEK to remove residual 2-nitrobenzyl alcohol and HDI that were left unreacted, and then designated as the compound 3 having the structure specified by the following formula 9.

Formula 9

(Synthesis of the Compound Represented by the Formula 4)

Compound 4

4,4'-diphenylmethane diisocyanate (MDI) was dissolved in MEK to which formic acid was added dropwise such that a ratio in moles of the COOH group of formic acid to the isocyanate group of MDI was brought to 1:1. Thereafter, they were allowed to react until the isocyanate group was reduced to 10% or less of its initial amount.

The resulting white crystal was washed with MEK to remove residual formic acid and MDI that were left unreacted, and then designated as the compound 4 having the structure specified by the following formula 10.

Formula 10

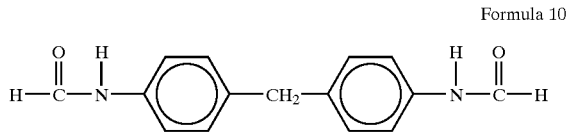

(Structure Identification of the Compound 1–4 from Infrared Absorption Spectra)

Figure 2:
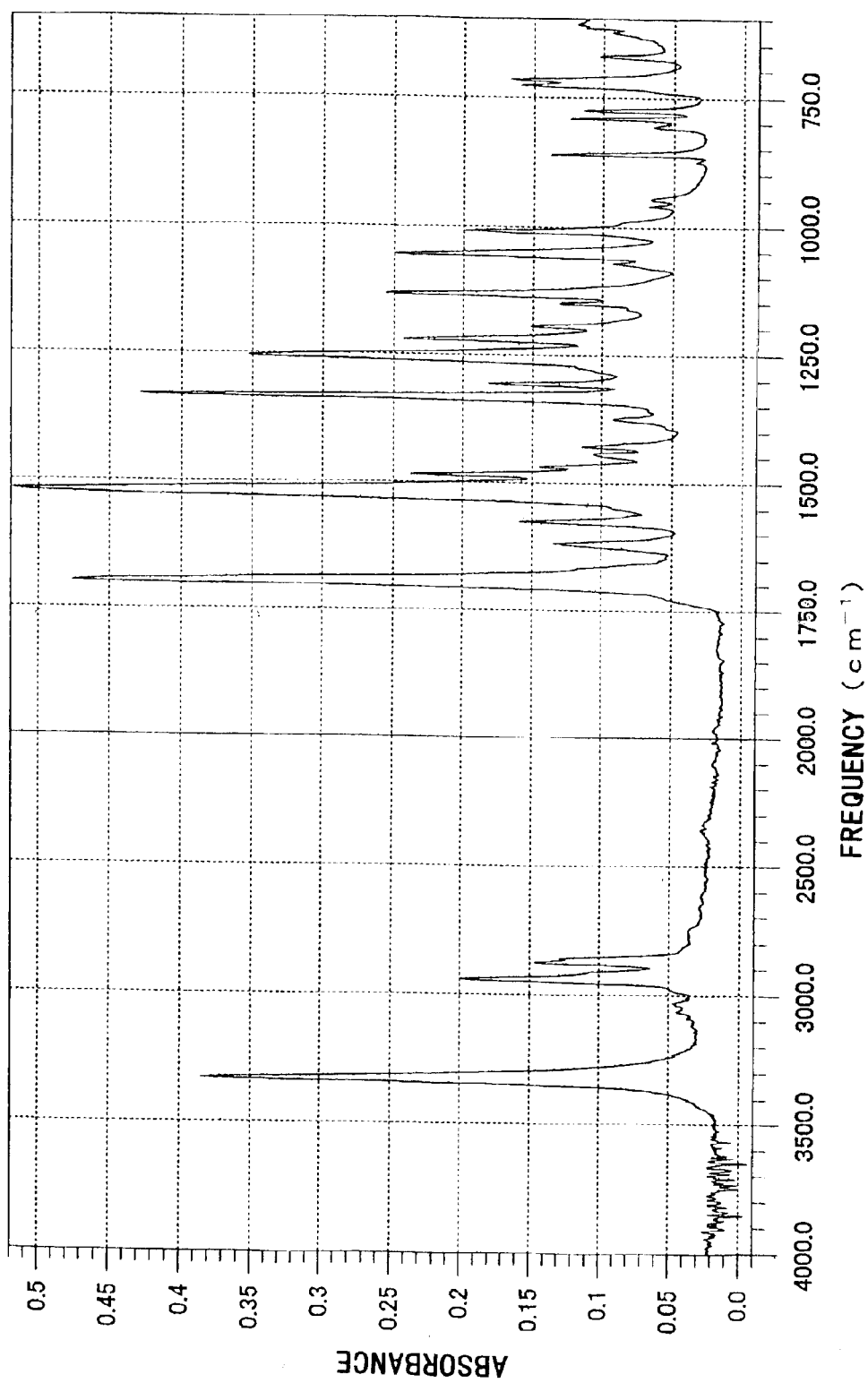
FIG. 2 is a chart showing an infrared absorption spectrum of the compound 2 prepared in the Example.
Figure 3:
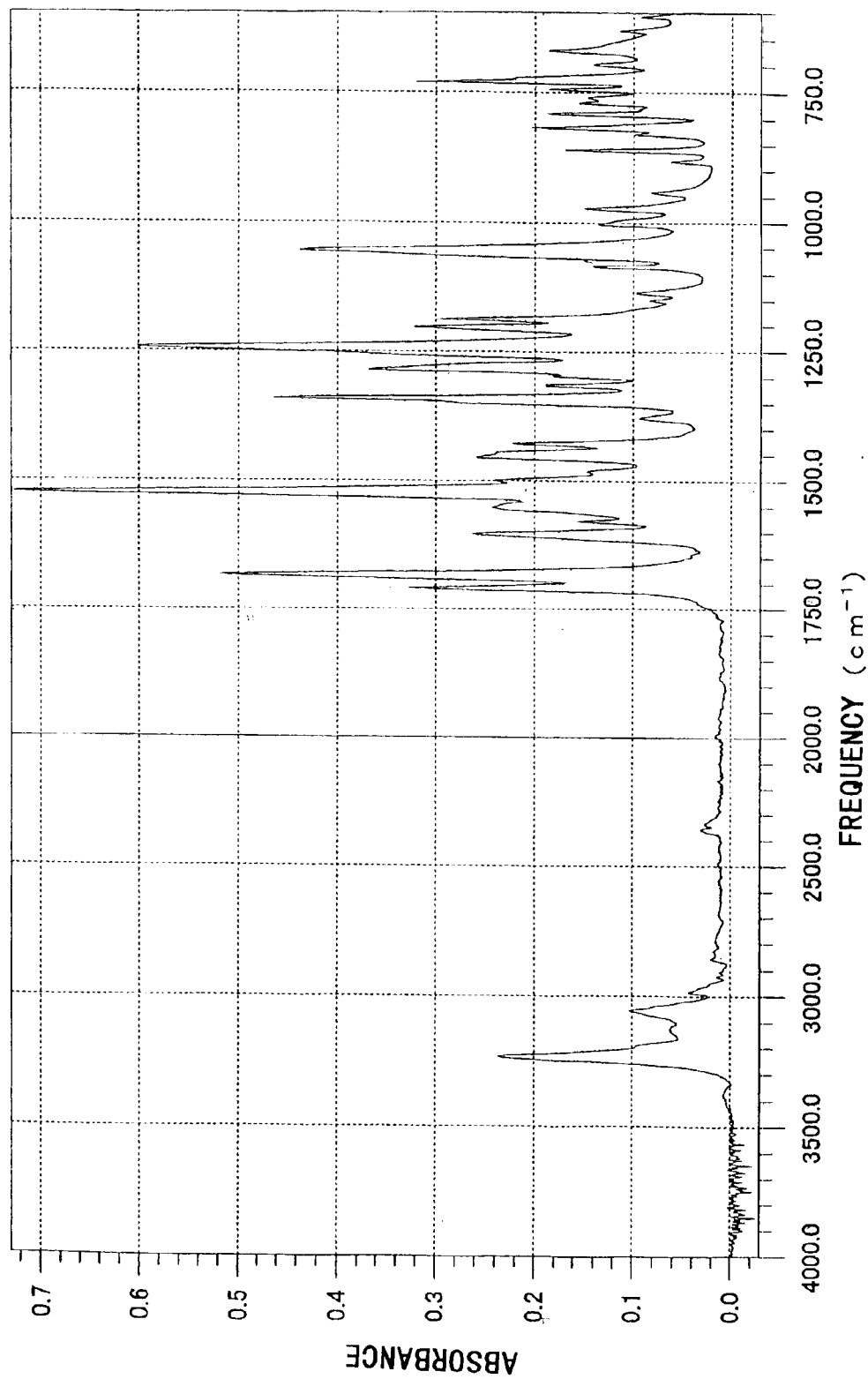
FIG. 3 is a chart showing an infrared absorption spectrum of the compound 3 prepared in the Example.
Figure 4:
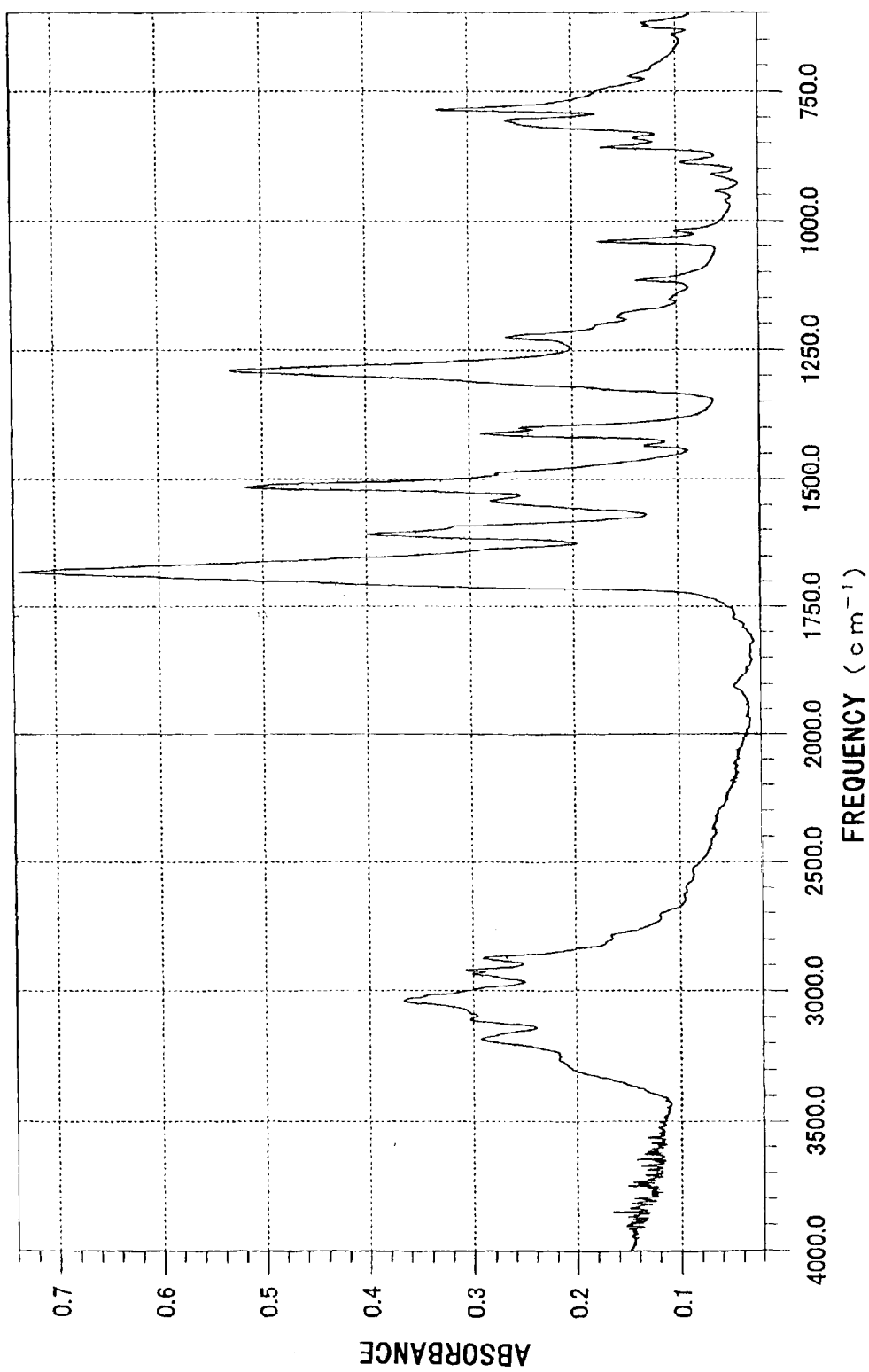
FIG. 4 is a chart showing an infrared absorption spectrum of the compound 4 prepared in the Example.

FIGS. 1–4 are charts respectively showing infrared absorption spectra of the compounds 1–4. Characteristic frequencies appearing on the respective charts for the compounds 1–4 and their corresponding bonds are listed in the following Table 1.

TABLE 1

| Compound 1 | $1761\ cm^{-1}$ | ($-\overset{O}{\underset{\|}{C}}-O-$) | | |
|---|---|---|---|---|
| Compound 2 | $1681\ cm^{-1}$ | ($\overset{O}{\underset{\|}{C}}-N$), | $1524\ cm^{-1}$ | ($-\overset{H}{\underset{\|}{N}}-$) |
| Compound 3 | $1697\ cm^{-1}$ | ($\overset{O}{\underset{\|}{C}}-N$), | $1517.9\ cm^{-1}$ | ($-\overset{H}{\underset{\|}{N}}-$) |
| Compound 4 | $1682\ cm^{-1}$ | ($\overset{O}{\underset{\|}{C}}-N$), | $1516\ cm^{-1}$ | ($-\overset{H}{\underset{\|}{N}}-$) |

(Preparation of Urethane Prepolymer)

A polyol was provided containing 50 parts by weight of polyether triol having a number average molecular weight of 4,000 (product of Asahi Denka Kogyo Co., proudct name: ADEKA POLYETHER T-4000) and made via ring-opening polymerization of trimethylolpropane and propylene oxide, and 50 parts by weight of polyether polyol (number average molecular weight of 6,000) made via ring-opening polymerization of propylene oxide. This polyol was blended with diphenylmethane-4,4'-diisocyanate (product of Nippon Polyurethane Industry, Co., Ltd., product name: MILIONATE MT) so that a ratio of the NCO group of the diisocyanate to the OH group of the polyol, i.e., an NCO/OH ratio was brought to 1:1. The blend was subsequently allowed to react at 80° C. for 5 hours, so that a urethane prepolymer was obtained.

EXAMPLE 1

5 parts by weight of the compound 1 was added to 100 parts by weight of the urethane prepolymer. The mixture was stirred under nitrogen atmosphere to homogeneity so that a one-part photoreactive adhesive composition was obtained.

EXAMPLE 2

5 parts by weight of the compound 2 was added to 100 parts by weight of the urethane prepolymer. The mixture was stirred under nitrogen atmosphere to homogeneity so that a one-part photoreactive adhesive composition was obtained.

EXAMPLE 3

The procedure of Example 1 was followed, except that the compound 2 was replaced by the compound 3, to obtain a one-part photoreactive adhesive composition.

EXAMPLE 4

The procedure of Example 1 was followed, except that the compound 1 was replaced by the compound 3, to obtain a one-part photoreactive adhesive composition.

EXAMPLE 5

5 parts by weight of the compound 1, together with 0.5 parts by weight of thioxanthone ("DETX-S", name used in trade and manufactured by Nippon Kayaku Co.) as a photosensitizer, were added to 100 parts by weight of the urethane prepolymer. The mixture was stirred under nitrogen atmosphere to homogeneity so that a one-part photoreactive adhesive composition was obtained.

EXAMPLE 6

The procedure of Example 5 was followed, except that the compound 1 was replaced by the compound 2, to obtain a one-part photoreactive adhesive composition.

EXAMPLE 7

The procedure of Example 5 was followed, except that the compound 1 was replaced by the compound 3, to obtain a one-part photoreactive adhesive composition.

EXAMPLE 8

The procedure of Example 5 was followed, except that the compound 1 was replaced by the compound 4, to obtain a one-part photoreactive adhesive composition.

EXAMPLE 9

5 parts by weight of the compound 1, together with 0.5 parts by weight of benzophenone as a photosensitizer, were added to 100 parts by weight of the urethane prepolymer. The mixture was stirred under nitrogen atmosphere to homogeneity so that a one-part photoreactive adhesive composition was obtained.

COMPARATIVE EXAMPLE

The urethane prepolymer was used alone.

(Evaluation)

The one-part photoreactive adhesive compositions of Examples 1–9 and the prepolymer of Comparative Example were evaluated for (1) initial bond strength, (2) bond strength after cure, (3) heat resistance and (4) gel fraction in accordance with the following procedures.

(1) Initial bond strength: Each adhesive was applied onto one surface of a stainless steel plate (measuring 3 cm×10 cm×0.2 cm and weighing 45 g) previously polished at 23° C. atmosphere to provide thereon a 100 $\mu$m thick, 3 cm×3 cm adhesive coat. Thereafter, the adhesive coat was exposed to a radiation at 40 mW/cm² for 10 minutes, using a high-pressure mercury lamp (JETLIGHT-2300 manufactured by Oak Seisakusho Co.). Another stainless steel plate, measuring 3 cm×10 cm×0.2 cm and weighing 45 g, was placed onto the adhesive coat. Immediately after combination, the laminate was measured for shear bond strength at a pulling rate of 50 mm/min to determine an intial bond strength.

(2) Bond strength aftre cure: Each adhesive was applied onto one surface of a stainless steel plate (measuring 3 cm×10 cm×0.2 cm and weighing 45 g) previously polished at 23° C. atmosphere to provide thereon a 100 um thick, 3 cm×3 cm adhesive coat. Thereafter, the adhesive coat was exposed to a radiation at 40 mW/cm² for 10 minutes, using a high-pressure mercury lamp (JETLIGHT-2300 manufactured by Oak Seisakusho Co.). Another stainless steel plate, measuring 3 cm×10 cm×0.2 cm and weighing 45 g, was placed onto the adhesive coat. The laminate was aged at 23° C. for 7 days and then measured for shear bond strength at a pulling rate of 50 mm/min to determine a bond strength after cure.

(3) Heat resistance measurement: Each adhesive was applied onto a stainless steel plate previously polished at 23° C. atmosphere to provide thereon a 100 μm thick adhesive coat which was then exposed to a radiation at 40 mW/cm² for 10 minutes, using a high-pressure mercury lamp (JETLIGHT-2300 manufactured by Oak Seisakusho Co.). Another stainless steel plate, measuring 3 cm×10 cm×0.2 cm and weighing 45 g, was placed onto the adhesive coat. Immediately after combination, the test piece was placed in a 150° C. oven. One of the stainless steel plates was fixed to suspend the test piece in a manner that its adhesive surface oriented vertically. After the 30-minute observation, the downward movement of the other stainless steel plate was measured.

(4) Gel fraction measurement: Each adhesive was applied onto a polyethylene terephthalate film surface that was release treated at 23° C. atmosphere to provide thereon a 100 μm thick adhesive coat which was subsequently exposed to a radiation at 40 mW/cm² for 10 minutes, using a high-pressure mercury lamp (JETLIGHT-2300 manufactured by Oak Seisakusho Co.). After removal from the release surface, the adhesive coat was dissolved in tetrehydrofuran. An insoluble matter was regarded as a gel to determined a gel fraction.

The results are given in the following Table 2.

TABLE 2

| | Initial Bond Strength (N/cm²) | Bond Strength After Cure (N/cm²) | Heat Resistance | Gel Fraction (Wt. %) |
|---|---|---|---|---|
| Ex. 1 | 55 | 490 | No Appreciable Movement | 15 |
| Ex. 2 | 49 | 490 | No Appreciable Movement | 10 |
| Ex. 3 | 49 | 490 | No Appreciable Movement | 10 |
| Ex. 4 | 49 | 490 | No Appreciable Movement | 5 |
| Ex. 5 | 65 | 490 | No Appreciable Movement | 20 |
| Ex. 6 | 58 | 490 | No Appreciable Movement | 15 |
| Ex. 7 | 58 | 490 | No Appreciable Movement | 15 |
| Ex. 8 | 58 | 490 | No Appreciable Movement | 10 |
| Ex. 9 | 60 | 490 | No Appreciable Movement | 10 |
| Comp. Ex. | 0 | 50 | Dropped After 30 Sec. | 0 |

The adhesive of Comparative Example, because of its sole inclusion of the urethane prepolymer, exhibits little intial bond strength immediately after it has combined the plates. It also shows a low level of heat resistance.

On the other hand, the adhesive compositions of Examples 1–9 exhibit sufficient initial bond strength and heat resistance since they generate amine upon exposure to a radiation and a reaction of the generated amine with the isocyanate group proceeds quickly. The adhesive composition of Example 5 exhibits the increased initial bond strength compared to the adhesive composition of Example 9. This is considered due to the increased photosensitizing action of thioxanthone than benzophenone.

UTILITY IN INDUSTRY

The photoreactive adhesive composition in accordance with the present invention constitutes a one-part adhesive using the urethane prepolymer. Because of inclusion of the compound which generates amine upon exposure to a radiation, the composition when exposed to a radiation, either before or after combination of adherends, generates amine with which the isocyanate group of the urethane prepolymer reacts quickly. Accordingly, the composition exhibits sufficient initial bond strength and heat resistance immediately after it combines the adherends. This eliminates or simplifies a troublesome operation in which members are provisionally held together before they are finally joined. As a result, a bonding procedure is effectively eased.

Also, a moisture-curing reaction of the isocyanate group of the urethane prepolymer further proceeds. As a result, the composition finally exhibits high bond strength comparable in level to conventional adhesives using the urethane prepolymer.

When the compounds represented by the formulas 1–3 are used as the preceding compound which generates amine upon exposure to a radiation, the composition upon exposure to a radiation generates primary or secondary amine with which the isocyanate group present therein reacts quickly. As a result, the composition immediately after it combines adherends exhibits the effectively increased initial bond strength and heat resistance.

The method of joining members in accordance with the present invention utilizes the photoreactive adhesive composition in accordance with the the present invention. In the method, the adhesive composition is exposed to a radiation, either before or after it combines the members, so that amine is generated to duly react with the isocyanate group. Hence, the improved initial bond strength and heat resistance results. This eliminates or simplifies a troublesome operation, such as provisional fixing. As a result, a bonding procedure is effectively eased. Finally, a moisture-curing of the urethane prepolymer assures firm adhesion between the members.

I claim:

1. A photoreactive adhesive composition comprising:
   A. an urethane prepolymer;
   B. a compound which generates amine upon exposure to a radiation; and
   C. a photosensitizer consisting of a thioxanthone compound represented by the following formula 4

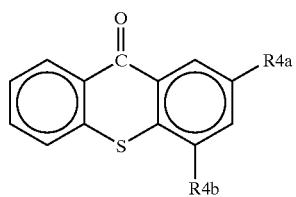

Formula 4 wherein R4a is hydrogen, alkyl or halogen and R4b is hydrogen or alkyl.

2. The photoreactive adhesive composition as recited in claim 1 wherein:
   said compound B which generates amine upon exposure to a radiation is a compound represented by the following formula 1

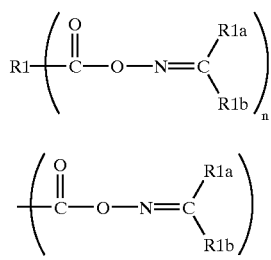

Formula 1

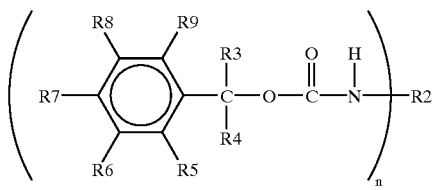

Formula 1a (In the formula 1, R1 is a main chain of a high polymer which has, at its side or end, an n-valent hydrocarbon or aromatic group or n groups represented by the formula 1a and n is an integer of 1 or larger. In the formulas 1 and 1a, R1a is an aromatic or alkyl group and R1b is an aromatic or alkyl group.)

3. The photoreactive adhesive composition as recited in claim 1 wherein:

said compound B which generates amine upon exposure to a radiation is a compound represented by the following formula 2

Formula 2

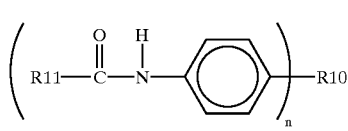

wherein R2 is a functional group comprised of C and H or C, H and 0, R3 and R4 represent any of hydrogen, halogen and alkyl, R5–R9 represent any of hydrogen, halogen, alkyl, alkoxy and nitro, and n is an integer of 1 or larger.

4. The photoreactive adhesive composition as recited in claim 1 wherein:

said compound B which generates amine upon exposure to a radiation is a compound represented by the following formula 3

Formula 3 wherein R10 is a functional group comprised of C and H or C, H and O, R11 represents hydrogen, hydrocarbon or aromatic, and n is an integer of 1 or larger.

5. A method of joining members characterized as including the steps of combining said members by using the adhesive composition as recited in any one of claims 1–4, and exposing the adhesive composition to a radiation prior to, simultaneously with or subsequent to the combination of the members.

* * * * *